US009117339B2

(12) United States Patent
Burke et al.

(10) Patent No.: US 9,117,339 B2
(45) Date of Patent: Aug. 25, 2015

(54) NETWORK GAMING MAINTENANCE AND REPAIR HISTORY

(75) Inventors: Mary M. Burke, Somonauk, IL (US); Craig J. Sylla, Round Lake, IL (US)

(73) Assignee: WMS Gaming, Inc., Waukegan, IL (US)

( * ) Notice: Subject to any disclaimer, the term of this patent is extended or adjusted under 35 U.S.C. 154(b) by 776 days.

(21) Appl. No.: 12/701,538

(22) Filed: Feb. 6, 2010

(65) Prior Publication Data

US 2010/0203961 A1 Aug. 12, 2010

Related U.S. Application Data

(60) Provisional application No. 61/150,406, filed on Feb. 6, 2009.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ............ *G07F 17/3232* (2013.01); *G07F 17/32* (2013.01)

(58) Field of Classification Search
CPC A63F 13/323; A63F 17/3234; G07F 17/3202
USPC ................................................ 463/20, 40–42
See application file for complete search history.

(56) References Cited

U.S. PATENT DOCUMENTS 6,427,176 B1 * 7/2002 Berglund et al. ................ 710/8
7,201,660 B2 * 4/2007 Kiely et al. .................... 463/42
7,515,718 B2 4/2009 Nguyen et al.
2003/0069648 A1 4/2003 Douglas et al.
2003/0195037 A1 10/2003 Vuong et al.
2004/0235562 A1 11/2004 Kiely et al.
2004/0266533 A1 12/2004 Gentles et al.
2006/0077608 A1 * 4/2006 Speno et al. ................ 361/93.1
2006/0148550 A1 7/2006 Nee, Jr. et al.
2006/0252530 A1 11/2006 Oberberger et al.
2006/0264253 A1 11/2006 Trobia
2008/0200255 A1 8/2008 Wisele
2008/0207314 A1 * 8/2008 DiMichele ...................... 463/29
2009/0197660 A1 8/2009 Cramer et al.
2009/0227363 A1 9/2009 Kelly et al.
2009/0233705 A1 9/2009 LeMay et al.

(Continued)

*Primary Examiner* — Milap Shah
*Assistant Examiner* — Jason Pinheiro
(74) *Attorney, Agent, or Firm* — DeLizio Law, PLLC

(57) ABSTRACT

Some embodiments include a computer-implemented method for tracking, over an electronic wagering game network, services performed on a wagering game machine. The method comprises: receiving, in the wagering game machine, a wagering game machine access identifier, wherein the wagering game machine access identifier indicates identity of a technician accessing a wagering game machine; detecting a service event in the wagering game machine; and generating a report indicating a modification to the wagering game machine. The method can also comprise receiving a technician log describing the modification to the wagering game machine; transmitting, to a service controller, the report, the log, and the wagering game machine access identifier. The method can also comprise receiving, from the service controller, maintenance information associated with the wagering game machine; and presenting the maintenance information on a display associated with the wagering game machine.

18 Claims, 8 Drawing Sheets

(56) References Cited

U.S. PATENT DOCUMENTS

2009/0247301 A1 10/2009 Hamlin et al.
2009/0258711 A1 10/2009 McKay
2009/0275395 A1 11/2009 McAllister

* cited by examiner

NETWORK GAMING MAINTENANCE AND REPAIR HISTORY

RELATED APPLICATIONS

This application claims priority benefit of U.S. Provisional Application Ser. No. 61/150,406 filed Feb. 6, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to maintaining wagering game system maintenance and repair history.

BACKGROUND

A wide variety of computerized wagering game machines are now available to casino operators and players. Computerized wagering game machines range from slot machines to games that are traditionally played live, such as poker, blackjack, roulette, etc. These wagering game machines provide many benefits to game owners and players, including increased reliability over mechanical machines, greater game variety, improved sound and animation, and lower overall management cost.

When technicians initially deploy wagering game machines for use in casinos, they may manually wire the machines into wagering game networks and manually configure numerous settings. For example, the technicians may configure settings such as currency denominations for bill validators, screen resolution for video displays, volume for an audio devices, etc. Technicians may also configure gaming machine settings by toggling DIP switches, moving expansion board jumpers, setting various dials and knobs, and paging through complicated set-up menus.

After deploying the wagering game machines into operation, technicians typically expend considerable efforts maintaining and repairing the machines. Technicians often utilize a variety of resources, such as service manuals and schematics, to facilitate the maintenance/repair process. However, despite these resources, even the most experienced technicians have difficulties maintaining and repairing wagering game machines in the field. Additionally, the maintenance/repair process can be complicated by a need for specialized tools and replacement parts.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the inventive subject matter.

Wagering game machines need frequent maintenance. Maintenance operations can include replacing components (e.g., replacing faulty reel mechanisms, worn-out ticket printer heads, etc.), replenishing components (e.g., refilling ticket paper), upgrading software, etc. However, for technicians who have to maintain and service scores of wagering game machines, the process of troubleshooting problems and finding solutions can be laborious and time-intensive. According to some embodiments of the inventive subject matter, wagering game machines can reduce time spent on maintenance and service by communicating maintenance and service information to a centralized service controller or other data repository. The maintenance information can include hardware and software errors encountered by the wagering game machine, information about technicians who worked on wagering game machine, and more. In some embodiments, the wagering game machines can record and transmit, to the service controller, technicians' logs detailing troubleshooting steps, solutions to problems, etc.

In some embodiments, service controllers can analyze the service information and provide technical support to field technicians on casino floors. For example, a service controller can help field technicians identify maintenance issues, provide troubleshooting/service manuals relevant to particular problems, and provide information about maintenance trends for particular wagering game machines.

Operating Environment

This section describes an example operating environment and presents structural aspects of some embodiments. This section includes discussion about wagering game machine architectures and wagering game network architectures.

Wagering Game Networks

Figure 1:
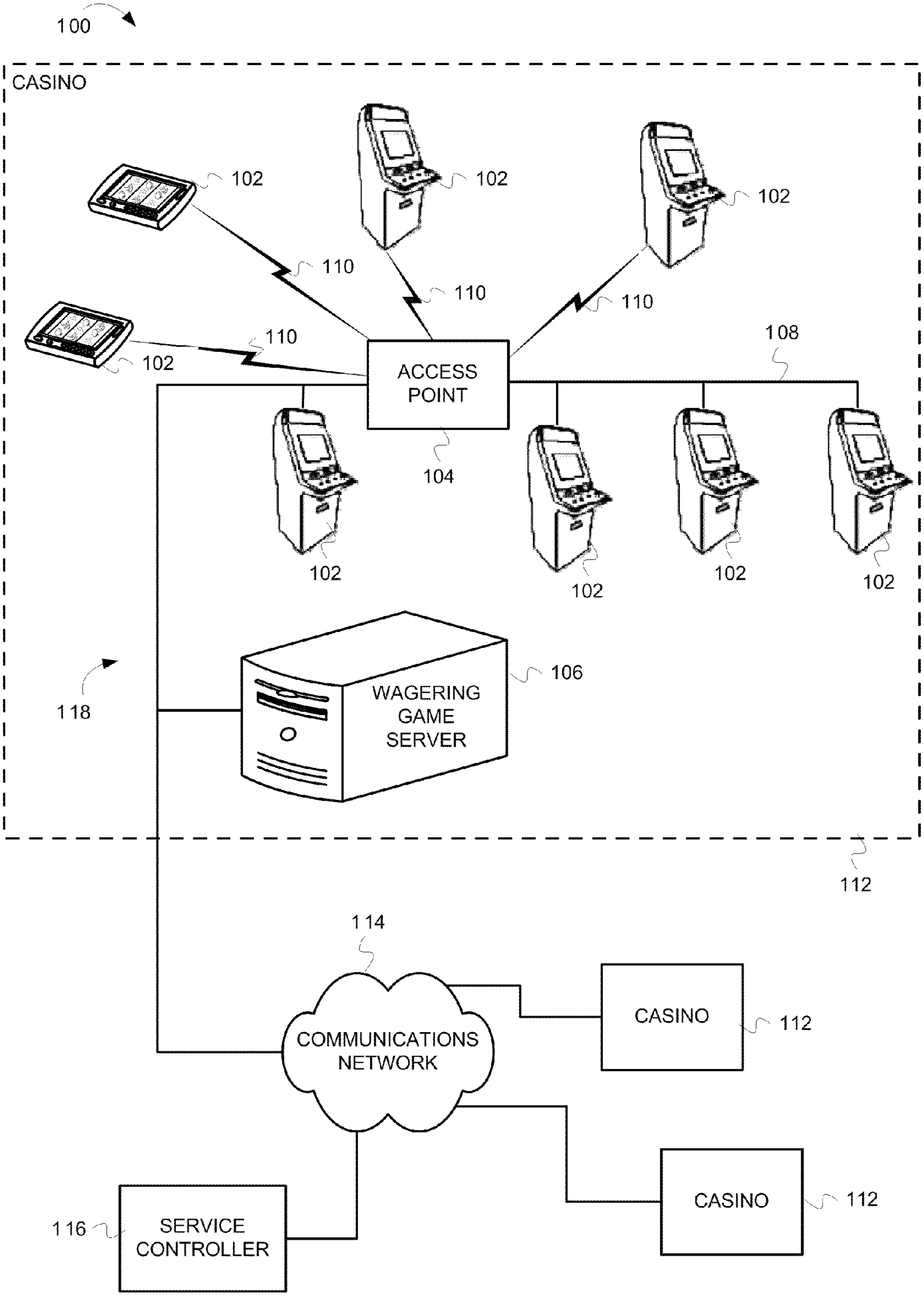
FIG. 1 is a block diagram illustrating a wagering game network, according to example embodiments of the invention.

FIG. 1 is a block diagram illustrating a wagering game network 100, according to example embodiments of the invention. As shown in FIG. 1, the wagering game network 100 includes a plurality of casinos 112 and a service controller 116 connected to a communications network 114.

Each casino 112 includes a local area network 118, which includes an access point 104, a wagering game server 106, and wagering game machines 102. The access point 104 provides wireless communication links 110 and wired communication links 108. The wired and wireless communication links can employ any suitable connection technology, such as Bluetooth, 802.11, Ethernet, public switched telephone networks, SONET, etc. In some embodiments, the wagering game server 106 can serve wagering games and distribute content to devices located in other casinos 112 or at other locations on the communications network 114.

The service controller 116 can collect and analyze maintenance information for the wagering game machines 102 in the casinos 112. The service controller 116 can also transmit maintenance and troubleshooting information to the wagering game machines 102, in response to a technician's request for information (e.g., maintenance information, troubleshooting manuals, trends in maintenance data, etc). The service controller 116 can store a maintenance history for each wagering game machine 102 in each casino 112. In other implementations, each casino may have its own service controller. The casino's service controller can also store maintenance information on another component to maintain uniformity across the wagering game machines 102 and across the different casinos 112.

The wagering game machines 102 can communicate with the service controller 116 and report events (e.g., door open/close events, events indicating component removal, software update events, etc.). The wagering game machines 102 can also transmit reports indicating modifications made to the wagering game machines 102, events occurring in the wagering game machine, errors encountered by the wagering game machine 102, and technician logs indicating repairs made to the wagering game machine 102.

The wagering game machines 102 described herein can take any suitable form, such as floor standing models, handheld mobile units, bartop models, workstation-type console models, etc. Further, the wagering game machines 102 can be primarily dedicated for use in conducting wagering games, or can include non-dedicated devices, such as mobile phones, personal digital assistants, personal computers, etc. In one embodiment, the wagering game network 100 can include other network devices, such as accounting servers, wide area progressive servers, player-tracking servers, and/or other devices suitable for use in connection with embodiments of the invention.

In some embodiments, wagering game machines 102 and wagering game servers 106 work together such that a wagering game machine 102 can be operated as a thin, thick, or intermediate client. For example, one or more elements of game play may be controlled by the wagering game machine 102 (client) or the wagering game server 106 (server). Game play elements can include executable game code, lookup tables, configuration files, game outcome, audio or visual representations of the game, game assets, or the like. In a thin-client example, the wagering game server 106 can perform functions such as determining game outcome or managing assets, while the wagering game machine 102 can present a graphical representation of such outcome or asset modification to the user (e.g., player). In a thick-client example, the wagering game machines 102 can determine game outcomes and communicate the outcomes to the wagering game server 106 for recording or managing a player's account.

In some embodiments, either the wagering game machines 102 (client) or the wagering game server 106 can provide functionality that is not directly related to game play. For example, account transactions and account rules may be managed centrally (e.g., by the wagering game server 106) or locally (e.g., by the wagering game machine 102). Other functionality not directly related to game play may include power management, presentation of advertising, software or firmware updates, system quality or security checks, etc.

Any of the wagering game network components (e.g., the wagering game machines 102) can include hardware and machine-readable media including instructions for performing the operations described herein.

Wagering Game Machine Architectures

Figure 2:
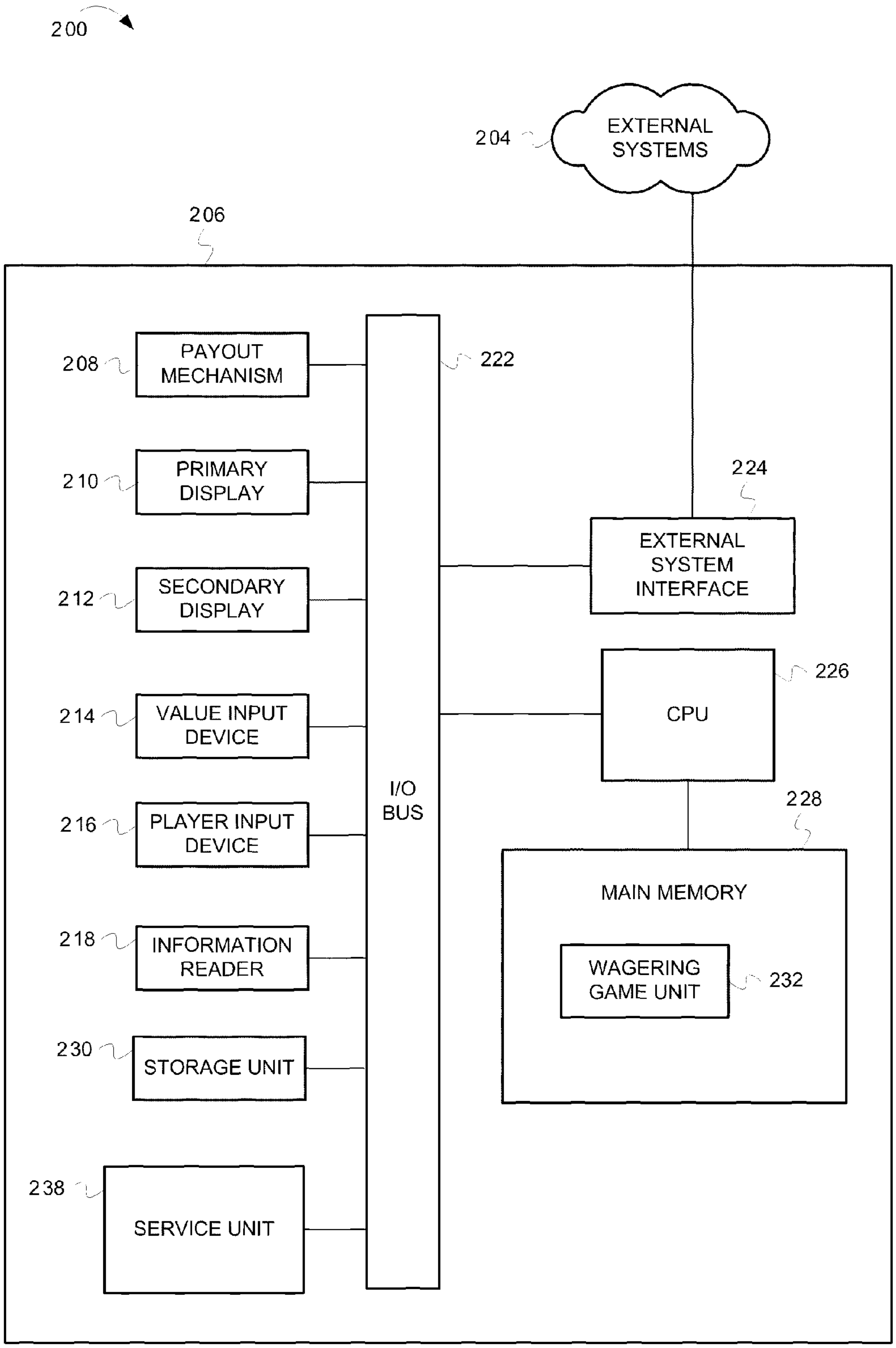
FIG. 2 is a block diagram illustrating wagering game machine architecture, according to example embodiments of the invention.

FIG. 2 is a block diagram illustrating wagering game machine architecture, according to example embodiments of the invention. As shown in FIG. 2, the wagering game machine architecture 200 includes a wagering game machine 206, which includes a central processing unit (CPU) 226 connected to main memory 228. The CPU 226 can include any suitable processor, such as an Intel® Pentium processor, Intel® Core 2 Duo processor, AMD Opteron™ processor, or UltraSPARC processor. The main memory 228 includes a wagering game unit 232. In one embodiment, the wagering game unit 232 can present wagering games, such as video poker, video black jack, video slots, video lottery, etc., in whole or part.

The wagering game machine 206 also comprises a service unit 238 coupled to an input/output (I/O) bus 222. Alternatively, some embodiments of the service unit 238 reside in the memory 228 and are executed on the CPU 226. The service unit 238 can detect events in the wagering game machine 206. For example, the service unit 238 may detect that a paper feeder in the wagering game machine 206 is empty and needs to be replenished. The service unit 238 can also detect and determine statuses of the wagering game machine 206. The service unit 238 may store information about status in a storage unit 230. The service unit 238 can also detect modifications made to the wagering game machine. The service unit 238 can compare previously logged statuses with a current status and determine whether a technician has modified components (e.g., replaced components, upgraded software, etc.) in the wagering game machine 206. The service unit 238 can also generate reports comprising detected events and the status of the wagering game machine, and the service unit 238 can transmit the reports to external components (e.g., a service controller). The service unit 238 can also receive information from technicians. For example, the service unit 238 can receive log files from technician's handheld devices. Also, the service unit 238 can present questionnaires asking about troubleshooting steps, solutions implemented, modifications made to the wagering game machine 206, etc. The service unit 238 can transmit the technician's information, along with all other information, to a service controller or other components.

The CPU 226 is also connected to the I/O bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, and the storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

Any component of the architecture 200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 2 describes an example wagering game machine architecture, this section continues with more details about service units.

Figure 3:
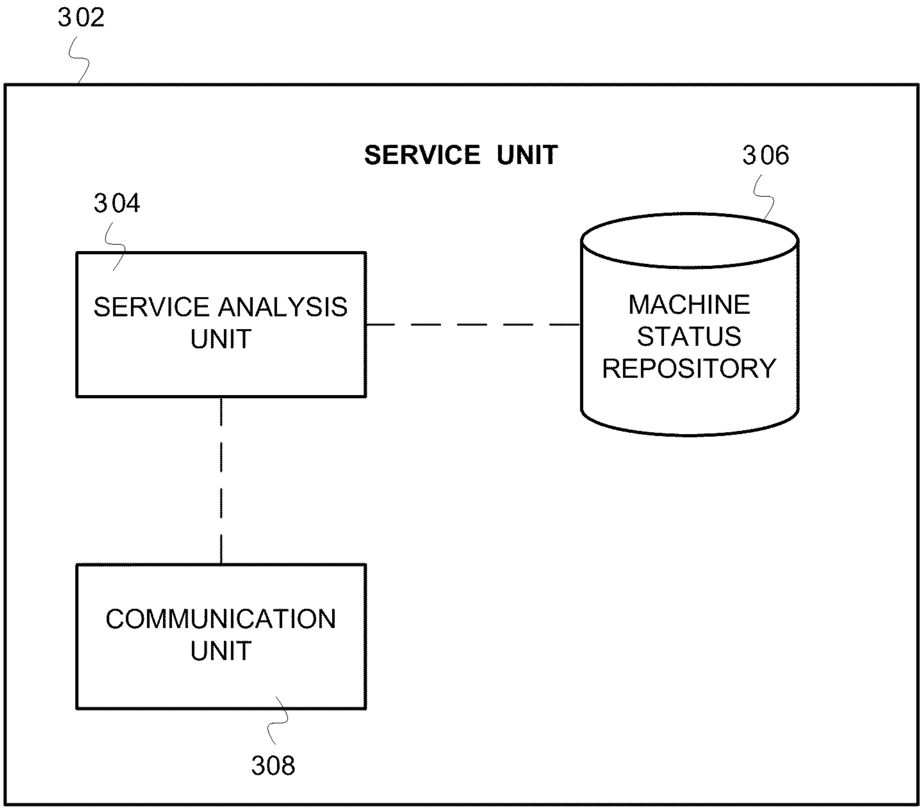
FIG. 3 is an example block diagram illustrating a service unit in a wagering game machine.

FIG. 3 is an example block diagram illustrating a service unit in a wagering game machine. The service unit 302 comprises a service analysis unit 304 coupled with a machine status repository 306 and a communication unit 308. The service analysis unit 304 can detect events occurring in the wagering game machine. For example, the service analysis unit 304 may detect an event indicating an opening of the wagering game machine door. A sensor on the door may report this event to the service analysis unit 304. The service analysis unit 304 may also detect a removal of components, peripherals, etc. in the wagering game machine. The service analysis unit 304 can also detect the state of the wagering game machine after modifications. For example, after the wagering game machine comes online (e.g., after the wagering game machine is powered on after maintenance), the service analysis unit 304 may determine component serial numbers, software version numbers, etc. and whether a technician has modified the wagering game machine. The service analysis unit 304 may also store the events and states of the wagering game machine in the machine status repository 306.

The machine status repository 306 can store information about various maintenance operations, events, status of the wagering game machine before maintenance and updates are performed, etc. The service analysis unit 304 can use information stored in the machine status repository 306 to perform any of the analyses and operations described herein. For example, the service analysis unit 304 can compare the machine's current state (e.g., state after maintenance operations) with earlier recorded states stored in the machine status repository 306. The service analysis unit 304 can communicate, via the communication unit 308, differences in the wagering game machine status to a service controller. The communication unit 308 may convert the data (e.g., detected events, wagering game machine status, change in components, technician reports, etc.) into suitable formats and transmit the data to a service controller or other component. Additionally, the communication unit 308 may receive technician logs, troubleshooting manuals, maintenance history, and other data from the service controller and transmit this information to the service analysis unit 304. The service analysis unit 304 can utilize other machine components to present the data to technicians in the field.

In some embodiments, some of the operations of the service unit 302 can be performed by components outside the wagering game machine. For example, in some embodiments, instead of the service analysis unit 304 performing certain analyses, those analyses may be performed by embodiments of the service controller.

Example Operations

This section describes operations associated with some embodiments of the invention. In the discussion below, the flow diagrams will be described with reference to the block diagrams presented above. However, in some embodiments, the operations can be performed by components not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 4:
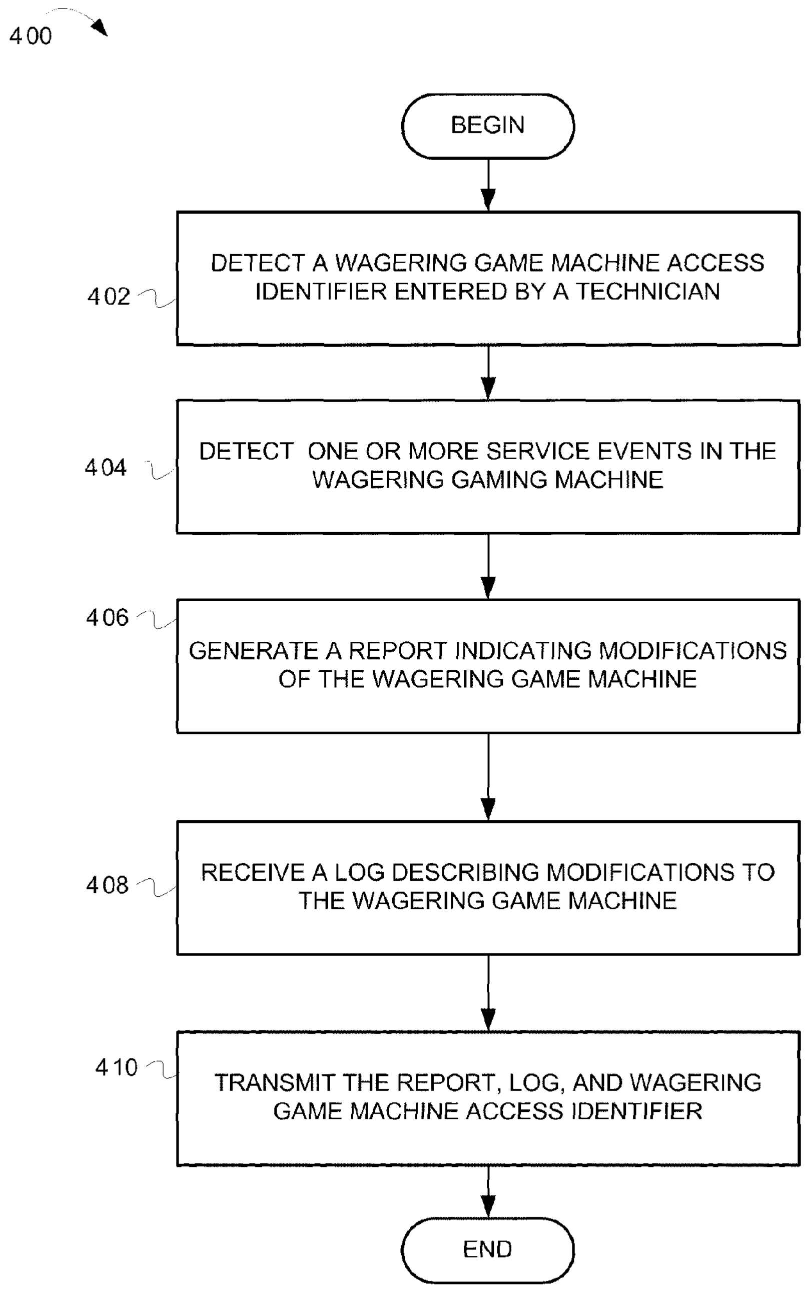
FIG. 4 is a flow diagram illustrating example operations for generating and transmitting service information associated with a wagering game machine.

FIG. 4 is a flow diagram illustrating example operations for generating and transmitting service information associated with a wagering game machine. Flow 400 will be described with reference to the block diagram of FIG. 3. The flow 400 begins at block 402.

At block 402, a wagering game machine's service analysis unit 304 detects a wagering game machine access identifier entered by a technician. The wagering gaming machine access identifier may originate from a biometric device (e.g., fingerprint scanner, retina scanner, face scanner, etc.), a swipe card, etc. The technician may also enter a series of alphanumeric characters on a keypad. The service analysis unit 304 may also use voice recognition, handwriting (e.g., signature) recognition, etc. to validate the technician. The wagering gaming machine access identifier helps the service analysis unit 304 identify technicians that have serviced the wagering game machine. The flow continues at block 404.

At block 404, the service analysis unit 304 detects one or more service events in the wagering game machine. Sensors on components or peripherals in the wagering game machine may detect service events. Service events can be associated with physical components of the wagering game machine, such as doors, buttons, levers, etc. For example, a sensor on the wagering game machine door may detect a "door open" and/or a "door close" event triggered by a technician accessing components inside the wagering game machine. As another example, the service analysis unit 304 may generate a "wagering game machine access" event when it receives a wagering game machine access identifier. The service analysis unit 304 may also detect maintenance events associated with wagering game maintenance. For example, the service analysis unit 304 may detect (e.g., based on a signal received from a sensor) that paper in a ticket printer should be reloaded, printer ink is running low, etc. As another example, a sensor on a printer head in the wagering game machine may generate an event indicating that the printer head is being disabled and replaced. Alternately, the service analysis unit 304 may also detect a service event after the wagering game machine comes online after maintenance. For example, after the wagering game machine comes online, the service analysis unit 304 may query each component of the wagering game machine for component serial numbers. The service analysis unit 304 may compare the serial numbers with a previously recorded list of component serial numbers and determine whether the technician has replaced one or more components of the wagering game machine. Similarly, the service analysis unit 304 can also determine whether the technician has upgraded or installed firmware and software on the wagering game machine.

In some embodiments, the service analysis unit 304 merely reports events to a service controller that performs the analyses described herein. The flow continues at block 406.

At block 406, the service analysis unit 304 generates a report indicating events, modifications, and other status information about the wagering game machine. For example, the service analysis unit 304 may detect that a technician has entered an access identifier and generate a report including a technician access identifier and a wagering game machine identifier. As another example, if the service analysis unit 304 detects a "door open" event, the service analysis unit 304 may generate a report of the event. The wagering game machine may later transmit the reports to a service controller or other components.

In some embodiments, the service analysis unit 304 can generate a report indicating differences in a current state of the wagering game machine as compared to a last logged state of the wagering game machine. For example, the service analysis unit 304 may compare serial numbers of the wagering game machine's components with the serial numbers stored in a machine status repository 306. The service analysis unit 304 may determine that the technician has replaced a reel mechanism in the wagering game machine. The service analysis unit 304 can generate a report indicating the replacement of the reel mechanism, a serial number of the replaced reel mechanism, a serial number of the new reel mechanism, etc. As another example, the service analysis unit 304 may also report that software has been updated or that software on a particular wagering game machine is old and should be updated.

Additionally, the service analysis unit 304 may generate an exhaustive report indicating a current state of every monitored parameter, component, and peripheral of the wagering game machine. The service analysis unit 304 may generate and transmit full wagering game machine reports to the service controller at regular intervals. The service analysis unit 304 may also report player-generated events. For example, the service analysis unit 304 may report player disputes, wagering game machine errors reported by players, etc.

In some implementations, the service analysis unit 304 may also generate reports indicating events about the wagering game machine's power consumption, network resource utilization, data communication efficiency, etc. For example, the service analysis unit 304 may indicate that the wagering game machine has switched from a high-powered state to a low powered state. As another example, the service analysis unit 304 may generate reports indicating that the wagering game machine is offline, has a high packet error rate, is dropping 60% of the packets, etc. The service analysis unit 304 can monitor the state of the wagering game machine in real time, generate reports indicating the real time status, notify the service controller of deviations from normal operation, events detected by sensors, errors encountered by the wagering game machine, maintenance operations performed on the wagering game machine, etc. The flow continues at block 408.

At block 408, the service analysis unit 304 receives, from a technician, a log describing modifications made to the wagering game machine. The technician's log can include information describing a technical problem, troubleshooting techniques used, wagering game machine components fixed or replaced, etc. The technician can generate the log by writing up a report. For example, the technician may connect a keyboard to a port (e.g., a USB port) and type a report on the wagering game machine. As another example, the service analysis unit 304 can display a checklist and/or a questionnaire on the wagering game machine's display screen and prompt the technician to fill out the questionnaire. The technician may also type out a report or fill out an electronic form on a handheld device and upload the report (or the form) to the wagering game machine. Alternately, the technician can use the handheld device to wirelessly transmit the report or the electronic form directly to a service controller. The flow continues at block 410.

At block 410, the service analysis unit 304 transmits, to the service controller, the report generated by the wagering game machine, the log received from the technician, and the technician's wagering game machine access identifier. In some implementations, the service analysis unit 304 may transmit the wagering game machine's report, the technician's log, and the technician's access identifier to a communication unit 308. The communication unit 308 may encode the information received from the service analysis unit 304 and transmit the encoded information using wired or wireless communication. From block 410, the flow ends.

Figure 5:
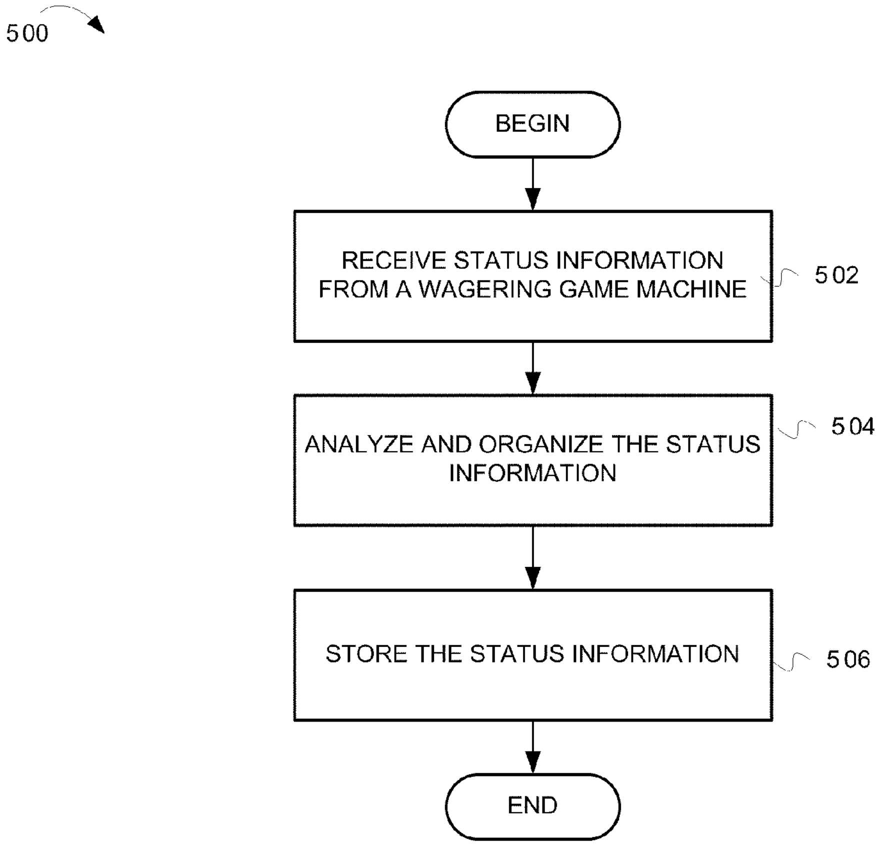
FIG. 5 is a flow diagram illustrating example operations for analyzing and storing wagering game machine status information.

In some embodiments, wagering game machines can send the reports including wagering status information to a service controller or other component for analysis. FIG. 5 is a flow diagram illustrating example operations for analyzing and storing wagering game machine status information. Flow 500 will be described in reference to the network diagram of FIG. 1. The flow 500 begins at block 502.

At block 502, a service controller 116 receives status information from a wagering game machine. The status information can comprise a report generated by a wagering game machine indicating modifications made to the wagering game machine, information provided by a technician, events generated by the wagering game machine, etc. The information provided by the technician may be in the form of a typed-out report, a questionnaire, a checklist, etc. The flow continues at block 504.

At block 504, the service controller 116 analyses and organizes the status information. The service controller 116 can compare reports generated by the wagering game machine to the information provided by technicians and can determine correlations between one or more events. The service controller 116 may analyze events, maintenance history, and/or an error log associated with a wagering game machine to determine whether maintenance activities performed by a technician solved one or more problems exhibited by the wagering game machine. Analyzing the information provided by the technician and the report generated by the wagering game machine can help the service controller 116 determine why certain events have been occurring. For example, the wagering game machine error log may indicate multiple "door open" and "door close" events per day over several months. The technician's report may indicate that the wagering game machine door was loose and that the door is now fixed. The service controller 116 may correlate this information and determine that the problem of the multiple door open/door close events was probably related to the loose door, which is now fixed. The service controller 116 can also flag the wagering game machine indicating that the door is fixed and a subsequent "door open" event is probably not related to a loose door.

Additionally, the service controller 116 can compare recently received status information of the wagering game machine with a last recorded status of the wagering game machine to determine variations in the wagering game machine's components, software versions, etc. The service controller 116 may notify a technician or casino manager in response to one or more events. For example, the service controller 116 may notify a casino manager if the service controller 116 receives a "door open" event without a technician's access identifier. The service controller 116 may also further authenticate technician access identifiers for additional security. In response to maintenance-related events, the service controller 116 may notify a technician of maintenance operations to be performed. For example, the service controller 116 can receive a "low printer ink" event, and can notify the technician that printer ink in a wagering game machine is running low. The service controller 116 may add this event to a list of maintenance operations to be performed. The service controller may receive information indicating that the ink cartridge in the printer has been replaced and accordingly indicate, e.g., in the wagering game machine's maintenance log, that the maintenance operations have been performed in response to the "low printer ink" event. The service controller 116 can also analyze the status information to track wagering game machine components. For example, the service controller 116 may track the movement of a CPU between machines on the floor of the casino. That is, in some instances, technicians may replace a wagering game machine's CPU, and then later use the CPU in a different machine.

The service controller 116 can use the technician's logs to determine whether the wagering game machine is detecting and/or reporting events. For example, if the service controller 116 receives status information without receiving a "door open" and a "door close" event, the service controller 116 may determine that sensors on the wagering game machine door are not working. As another example, the service controller 116 may also examine serial identification numbers reported by the wagering game machine and by the technician. For example, the service controller 116 may indicate an error if the serial number reported by the wagering game machine differs from the wagering game machine serial number reported by the technician.

The service controller 116 can also analyze the status information and create a view of the entire wagering game machine. The service controller 116 can also use the wagering game machine status information to track whether component installations, firmware installation, and software upgrades are successful. For example, if a machine continues to report ticket validator errors after replacing a ticket validator, the service controller 116 can deduce that the replacement did not remedy the fault. In turn, the service controller 116 can notify technicians about the persistent errors. The service controller can also analyze status information to track deviations in the wagering game machine's performance, perform hard drive analysis, and determine whether a batch of components is faulty. In some instances, the service controller 116 may also implement functionality to receive error notifications, perform troubleshooting operations on the wagering game machine, and remotely service the wagering game machine. The service controller 116 can also tag the status information received from different wagering game machines for easier archival and retrieval. The service controller 116 may also enable or disable a wagering game machine based on analysis of the status information. For example, the service controller 116 can disable the wagering game machine if the service controller 116 determines that the wagering game machine has a high error rate. The flow continues at block 506.

At block 506, the service controller 116 stores the status information. In some embodiments, the service controller 116 can store the status of every monitored component of the wagering game machine, irrespective of whether the component was modified. The service controller 116 may also store a variation from the previously logged state with information indicating a wagering game machine's current state. In some implementations, the service controller 116 may generate and store trends (e.g., charts, graphs, etc.) in performance across wagering game machines. The service controller 116 may update the wagering game machine's complete maintenance history every time the service controller 116 receives notifications of a new event or maintenance operations. From block 506, the flow ends.

So far, the discussion of FIGS. 4 & 5 has described operations for reporting wagering game information to service controllers, and operations for analyzing the wagering game information. Next, the discussion of FIGS. 6 & 7 will show how some embodiments provide maintenance histories to field technicians and other service personnel. More specifically, FIG. 6 explains how wagering game machines receive and present maintenance information, whereas FIG. 7 explains how service controllers can disseminate the maintenance information.

Figure 6:
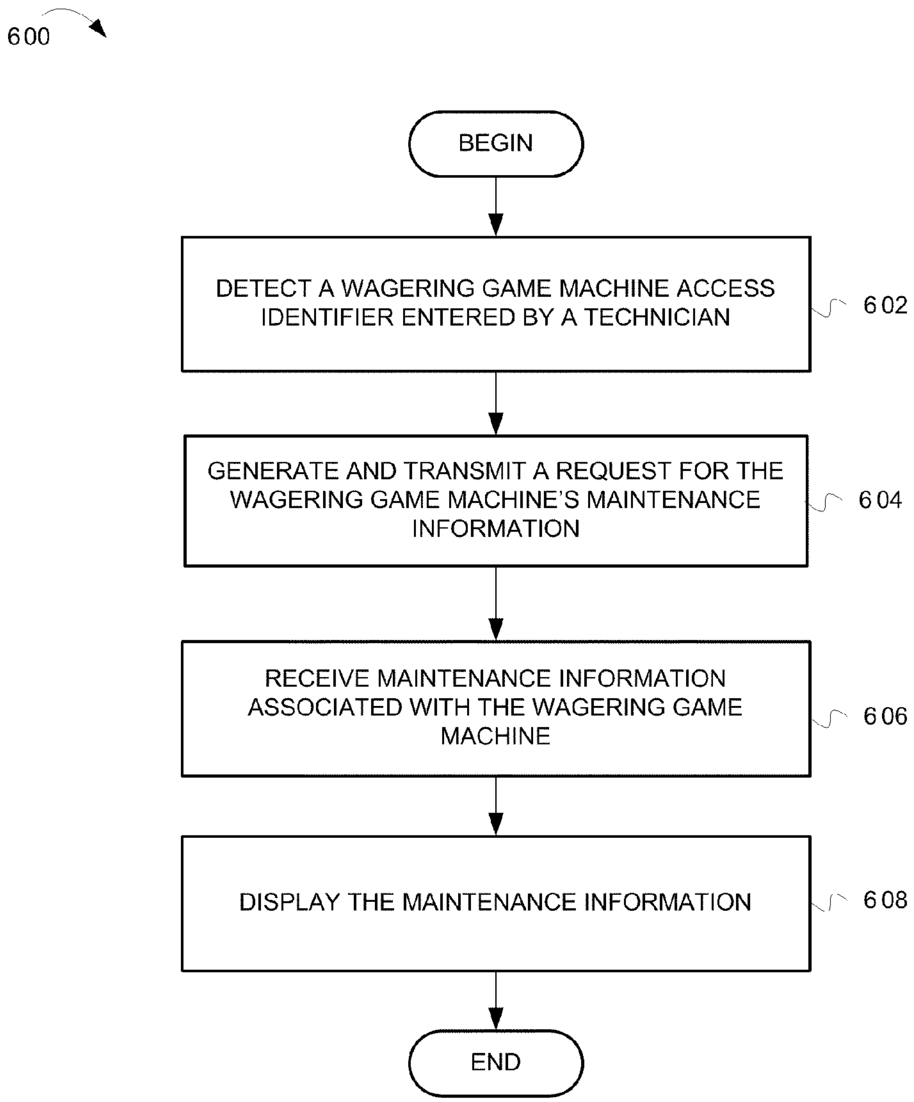
FIG. 6 is a flow diagram illustrating example operations for requesting a wagering game machine's maintenance history.

FIG. 6 is a flow diagram illustrating example operations for requesting a wagering game machine's maintenance history. Flow 600 will be described with reference to the block diagram of FIG. 3. The flow 600 begins at block 602.

At block 602, a wagering game machine's service analysis unit 304 detects a wagering game machine access identifier entered by a technician. As described earlier, the service analysis unit 304 may use any one or more of a biometric identifier, a swipe card, a series of numbers on a keypad, voice recognition, handwriting recognition, etc. to validate the technician. The flow continues at block 604.

At block 604, the service analysis unit 304 generates and transmits, to the service controller 116, a request for the wagering game machine's maintenance information. In some embodiments, the service analysis unit 304 transmits this request in response to an information request from a technician. For example, the technician may request a machine's maintenance history for a given time period, electronic troubleshooting manuals, etc. In transmitting this request for maintenance and troubleshooting information to the service controller 116, the service analysis unit 304 may also transmit the technician's initial assessment of the problem (e.g., the initial assessment can be part of the technician's log—see discussion of block 408). For example, the service analysis unit 304 may request maintenance history for a wagering game machine and notify the service controller 116 that the technician's initial analysis indicates that there may be a problem with the wagering game machine's printing module. Alternately, if the wagering game machine to be serviced does not have communication capabilities (e.g., communication circuitry is faulty, CPU does not function, etc.), the technician may send the request for maintenance information from a hand held device or another adjacent wagering game machine.

Additionally, the technician may also request information associated with other wagering game machines. For example, the technician may request maintenance history for wagering game machines with the same problem. As another example, the technician may also ask whether the wagering game machine being serviced has encountered a similar problem in the past. The technician may also ask for an analysis on whether the problem is related to one or more other maintenance operations, a component, or a combination of components. The technician may also want to know whether other wagering game machines currently have the same problem, and if so, how their configuration and components differ from the wagering game machine being serviced. If the technician solves the problem by replacing one or more components in relation to the problem, the technician may preempt errors in the other wagering game machines by querying the service controller 116 to identify other wagering game machines with the same one or more components. The flow continues at block 606.

At block 606, the service analysis unit 304 receives, from the service controller 116, maintenance information associated with the wagering game machine. In some implementations, the communication unit 308 may receive the maintenance information over a network connection and deliver the information to the service analysis unit 304. The service controller 116 may transmit the maintenance information to any one of the wagering game machine, an adjacent wagering game machine, and a hand held device, depending on where the information request (at block 604) originated. The maintenance information may comprise a troubleshooting manual or sections of the troubleshooting manual relevant to an identified problem. The maintenance information may also comprise one or more debugging solutions implemented by technicians who have worked on similar problems. Maintenance and status information garnered from multiple wagering game machines can help technicians troubleshoot and maintain the wagering game machine. The flow continues at block 608.

At block 608, the service analysis unit 304 interfaces with the wagering game machine's display unit and displays the maintenance information on the display unit. From block 608, the flow ends.

Figure 7:
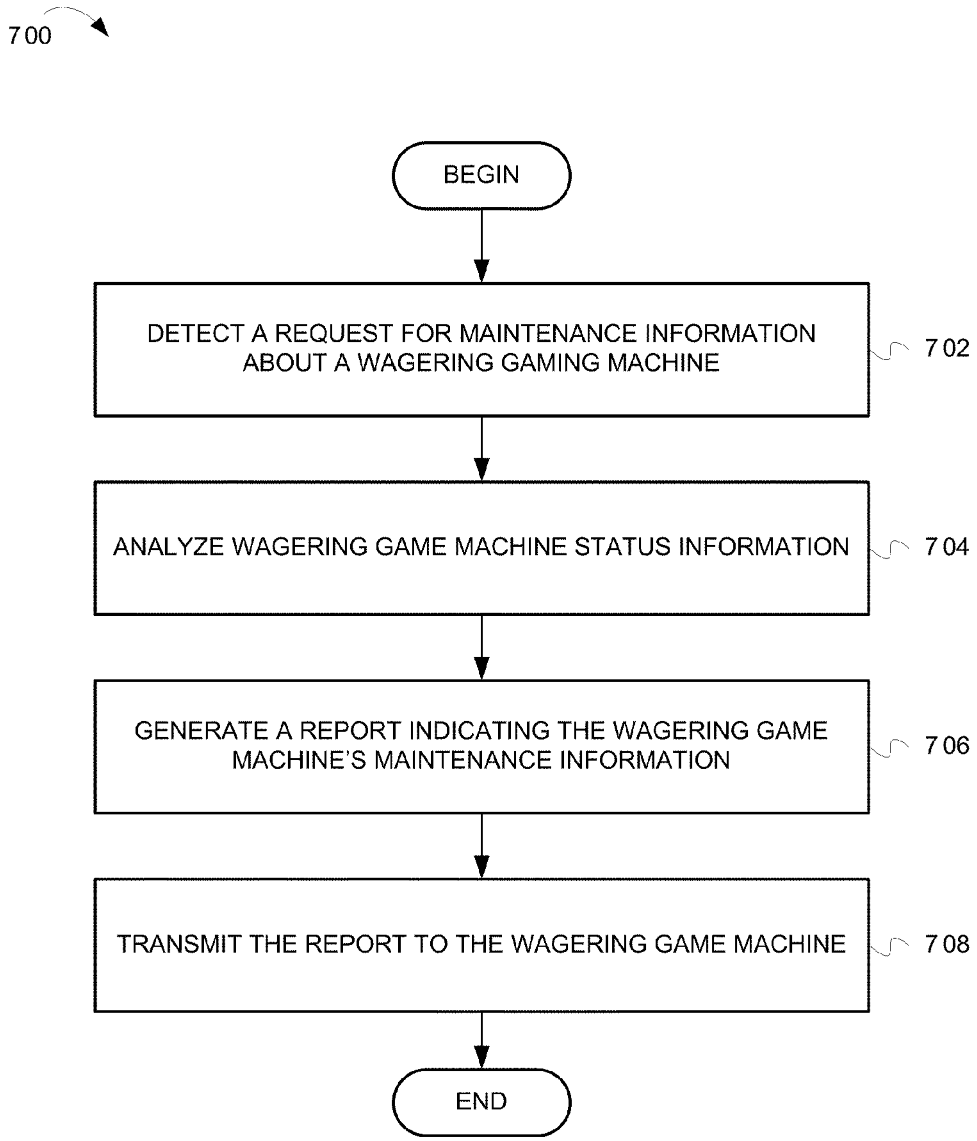
FIG. 7 is a flow diagram illustrating example operations for disseminating maintenance information associated with wagering game machines.

FIG. 7 is a flow diagram illustrating example operations for disseminating maintenance information associated with wagering game machines. Flow 700 will be described with respect to the network diagram of FIG. 1. The flow 700 begins at block 702.

At block 702, the service controller 116 detects a request for maintenance information about a wagering game machine. The request can include a request for the wagering game machine's maintenance history. For example, a technician may request a list of technicians who have worked on the wagering game machine, problems and errors encountered by the wagering game machine, a list of repaired or replaced components, a list of component and/or software upgrades, etc. The technician may also request trends, charts, and/or graphs describing the wagering game machine's performance. The technician may request maintenance history for a particular component or module in the wagering game machine. The technician may also request trends in performance and maintenance across different wagering game machines on a particular floor, throughout a casino, across different casinos, etc. In some embodiments, the wagering game machine's service unit requests the maintenance information without input from a technician (e.g., in response to receiving a technician's access identifier).

In some embodiments, the request may be for information associated with preventative maintenance. For example, although a wagering game machine may not be exhibiting a problem, a technician may request maintenance information about wagering game machines having the same or similar configuration. In some embodiments, the request can specify a configuration and ask for the trend information without specifying a particular wagering game machine. The trend can be associated with one or more components. As another example, a technician can request information about all wagering game machines that have exhibited a particular behavior in the last 30 days. For example, the request may be for a list of wagering game machines that have exhibited ticket printer faults. Thus, in some embodiments, the requests are not limited to information about a particular machine or problem. The flow continues at block 704.

At block 704, the service controller 116 analyses wagering game machine information. The service controller 116 can perform this analysis in response to the request received at block 702. In some embodiments, this service controller analyses information that includes the status information described above, in the discussion of FIG. 5. The service controller 116 can analyze stored maintenance records and technician logs to generate one or more reports, graphs, charts, etc. indicating trends in maintenance history. For example, as a result of the analysis, the service controller 116 may determine that the central processing unit (CPU) on the wagering game machine has been repaired five times in the previous year. The service controller 116 can also identify technicians who have worked on the same wagering game machine or who have encountered or solved a similar problem. The service controller 116 can analyze logs generated by the technicians and generate a list of troubleshooting steps and possible solutions to the problem. The service controller 116 may also identify other problems, which may be related to the identified problem. In response to a technician's request, the service controller 116 can analyze maintenance history for other wagering game machines and determine trends across multiple wagering game machines. For example, the service controller 116 may determine that the reel mechanism on one wagering game machine was replaced five times per month for the past two months. The service controller 116 may accordingly determine other wagering game machines with the same type of reel mechanism (e.g., the same brand or same type of reel mechanism). If the wagering game machine's maintenance history indicates that a particular component was replaced, the service controller 116 may identify other wagering game machines with the same component or combination of components. The flow continues at block 706.

At block 706, the service controller 116 generates a report indicating the wagering game machine's maintenance information. The report can include results of the analysis performed at block 704, sections of a troubleshooting manual relevant to the problem indicated by the technician, etc. The flow continues at block 708.

At block 708, the service controller 116 transmits the report to the wagering game machine for display to field technicians and service personnel. The service controller 116 can also transmit the report to adjacent wagering game machines or a hand held device, if requested by the technician. The technician can refer to the reports to remedy the wagering game machine problems. From block 708, the flow ends.

Example Wagering Game Machines

Figure 8:
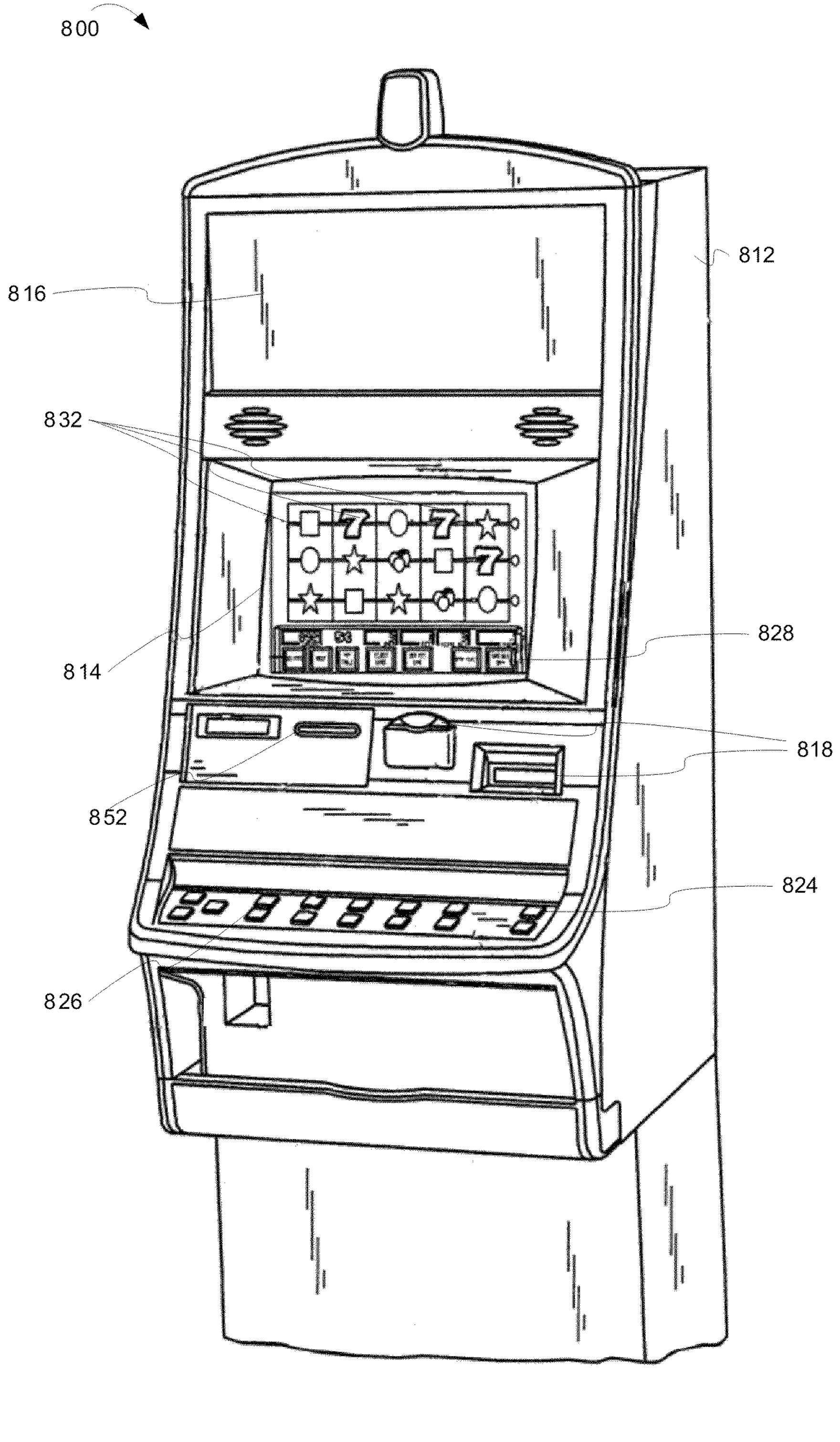
FIG. 8 is a perspective view of a wagering game machine, according to example embodiments of the invention.

FIG. 8 is a perspective view of a wagering game machine, according to example embodiments of the invention. Referring to FIG. 8, a wagering game machine 800 is used in gaming establishments, such as casinos. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an “upright” version in which the primary display 814 is oriented vertically relative to the player. Alternatively, the wagering game machine can be a “slant-top” version in which the primary display 814 is slanted at about a thirty-degree angle toward the player of the wagering game machine 800. In yet another embodiment, the wagering game machine 800 can exhibit any suitable form factor, such as a free-standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for facilitating, over an electronic wagering game network, electronic services performed on a wagering game machine, the method comprising:

receiving, via first user input from an input device of the wagering game machine, a first wagering game machine access identifier indicating a first technician accessing the wagering game machine;

detecting, via one or more processors of the wagering game machine, a service event stored in a memory storage device associated with the wagering game machine;

detecting, in response to the service event, a modification to a component of the wagering game machine, wherein the detecting the modification to the component includes comparing information about current components of the wagering game machine with information about past components previously residing in the wagering game machine;

generating, via at least one of the one or more processors, a report indicating the modification to the component;

generating a technician log describing a procedure for the modification to the component;

transmitting, to a service controller via the electronic wagering game network, the report, the technician log, and the first wagering game machine access identifier;

receiving, via second user input from the input device, a second wagering game machine access identifier indicating a second technician accessing the wagering game machine;

after receiving the second wagering game machine access identifier, receiving, from the service controller, the report indicating the modification to the component and the technician log describing the procedure for the modification to the component;

detecting, from one or more of the memory storage device associated with the wagering game machine and a sensor of the wagering game machine, a problem with the component;

determining, based on analysis of the report by at least one of the one or more processors, that the component was previously modified;

obtaining the procedure for the modification to the component electronically from the technician log in response to the determining that the component was previously modified; and presenting an indication of the procedure for the modification to the component via an electronic display device associated with the wagering game machine.

2. The method of claim 1, wherein the input device comprises one or more of a biometric device, a swipe card, a keypad, and a voice device.

3. The method of claim 1, wherein the procedure for the modification to the component included in the technician log comprises one or more of information describing the problem, steps for troubleshooting the problem, and steps for replacing the component.

4. The method of claim 1, wherein the generating the report indicating the modification to the component comprises generating state information indicating a state of the component during the modification to the component, and including the state information in the report.

5. The method of claim 1, wherein the report comprises one or more of a troubleshooting manual, a section of a troubleshooting manual relevant to an identified error in the wagering game machine, and a history of maintenance operations performed on the wagering game machine.

6. The method of claim 1, wherein the service event comprises one or more of a physical event, a maintenance event, a player generated event, a power management event, and a data communication event.

7. The method of claim 1, wherein the detecting the modification to the component comprises:

analyzing the service event via at least one of the one or more processors;

determining, based on the analyzing of the service event, a first state of the component associated with the service event;

accessing, from the memory storage device associated with the wagering game machine, data that indicates a second state of the component before the service event;

comparing, via at least one of the one or more processors of the wagering game machine, the first state to the second state; and detecting the modification to the component in response to the comparing the first state to the second state.

8. The method of claim 1 wherein the detecting the modification to the component comprises detecting data that indicates the problem with the component; wherein the determining that the component was previously modified comprises electronically comparing contents of the report to the data, and determining, via at least one of the one or more processors, a correlation between the modification to the component and the problem with the component based on the electronically comparing; and wherein the obtaining the procedure for the modification to the component electronically from the technician log comprises electronically searching the technician log for an indication of the modification to the component in response to determining the correlation, and copying the procedure for the modification to the component from the technician log into a memory buffer of the wagering game machine in response to the electronically searching.

9. A wagering game system comprising:

one or more processors;

an input device;

a network communications interface configured for communications via an electronic wagering game network;

an electronic display device; and one or more memory storage devices configured to store instructions, which when executed by at least one of the one or more processors, cause the wagering game system to, receive, via user input from the input device, a first access identifier identifying a first technician who accessed the wagering game system;

detect a service event stored in at least one of the one or more memory storage devices;

detect, in response to the service event, a modification to a component of the wagering game system, wherein detection of the modification to the component includes comparison of information about current components of the wagering game system with information about past components of the wagering game system;

generate a report indicating the modification to the component;

receive a technician log describing a procedure for the modification to the component;

transmit, via the network communications interface, the report and the technician log to a service controller;

receive, via the input device, a second access identifier identifying a second technician who accessed the wagering game system;

receive, from the service controller after receipt of the second access identifier, the report and the technician log;

detect data that indicates a problem with the component, wherein the data originates from one or more of a memory storage device associated with the wagering game system and a sensor of the wagering game system, analyze the report, determine, based on analysis of the report, a correlation between the modification to the component and the problem with the component, obtain the procedure for the modification to the component electronically from the technician log in response to determination of the correlation between the modification to the component and the problem; and present an indication of the procedure for the modification to the component via the electronic display device.

10. The wagering game system of claim 9, wherein the input device comprises one or more of a biometric device, a swipe card, a keypad, and a voice device.

11. The wagering game system of claim 9, wherein the one or more memory storage devices are configured to store instructions, which when executed by at least one of the one or more processors, cause the wagering game system to generate state information indicating a state of the component during the modification to the component and include the state information in the report.

12. The wagering game system of claim 9, wherein the procedure for modification to the component included in the technician log comprises one or more of information describing the problem, steps for troubleshooting the problem, and steps for replacing the component.

13. The wagering game system of claim 9, wherein the report comprises one or more of a troubleshooting manual, a section of a troubleshooting manual relevant to an identified error in the wagering game system, and a history of maintenance operations performed on the wagering game system.

14. An apparatus comprising:

means for receiving, via an input device of a wagering game machine, a first wagering game machine access identifier identifying a first technician accessing the wagering game machine;

means for detecting a service event stored in a memory storage device associated with the wagering game machine;

means for detecting, in response to the service event, a modification to a component of the wagering game machine, wherein the detecting the modification to the component includes comparing information about current components of the wagering game machine with information about past components previously residing in the wagering game machine;

means for generating, in the wagering game machine, a report indicating the modification to the component;

means for generating a log describing a procedure for the modification to the component;

means for transmitting, to a service controller via an electronic wagering game network, the report, the log, and the first wagering game machine access identifier;

means for receiving, via the input device of the wagering game machine, a second wagering game machine access identifier indicating a second technician accessing the wagering game machine;

means for receiving, from the service controller, after receipt of the second wagering game machine access identifier, the report indicating the modification to the component and the log describing the procedure for the modification to the component;

means for detecting, from one or more of the memory storage device associated with the wagering game machine and a sensor of the wagering game machine, a problem with the component;

means for determining, based on analysis of the report by the apparatus, that the component was previously modified;

means for obtaining the procedure for the modification to the component electronically from the log in response to the determining that the component was previously modified; and means for presenting an indication of the procedure on a display associated with the wagering game machine.

15. The apparatus of claim 14, wherein the input device is one or more of a biometric device, a swipe card, a keypad, and a voice device.

16. The apparatus of claim 14, wherein the procedure for the modification to the component included in the log comprises one or more of information describing the problem, steps for troubleshooting the problem, and steps for replacing the component.

17. The apparatus of claim 14, wherein the means for generating the report indicating the modification to the component comprises a means for generating state information indicating a state of the component during the modification to the component and means for including the state information in the report.

18. The apparatus of claim 14, wherein the report comprises one or more of a troubleshooting manual, a section of a troubleshooting manual relevant to an identified error in the wagering game machine, and a history of maintenance operations performed on the wagering game machine.

* * * * *